United States Patent

[11] 3,611,048

| [72] | Inventor | Bertrum S. Shelvik<br>Milwaukee, Wis. |
|---|---|---|
| [21] | Appl. No. | 52,856 |
| [22] | Filed | July 7, 1970 |
| [45] | Patented | Oct. 5, 1971 |
| [73] | Assignee | Cutler-Hammer, Inc.<br>Milwaukee, Wis. |

[54] PANELBOARD FOR CIRCUIT BREAKER LOAD CENTERS WITH INSULATOR BLOCK SUPPORTING CONNECTOR AND CONNECTOR SUPPORTING BUS BAR
15 Claims, 11 Drawing Figs.

[52] U.S. Cl.................................................. 317/119,
339/198 G
[51] Int. Cl....................................................... H02b 1/20,
H01r 9/16
[50] Field of Search........................................... 317/118,
119; 339/198 G, 198 GA, 198 H, 198 N

[56] References Cited
UNITED STATES PATENTS
| 3,173,063 | 3/1965 | Kussy | 317/119 |
| 3,280,379 | 10/1966 | Ellsworth | 317/119 |
| 3,309,580 | 3/1967 | Jacobs | 317/119 |

*Primary Examiner*—Lewis H. Myers
*Assistant Examiner*—Gerald P. Tolin
*Attorneys*—Hugh R. Rather and William A. Autio ABSTRACT: A selected plurality of two distinct insulating base members are secured to a sheet metal pan in a longitudinal row to form a desired one of the various types of panelboard arrangements. Adjacent bases are spaced and their opposite external surfaces cooperate to provide an additional circuit breaker mounting space. Electric branch connectors for the circuit breaker are electrically connected to longitudinally extending bus bars and the resulting physical connections therebetween cooperate with interlocking structure formed on the connectors and bases to mount the bus bars to the bases. The line terminal ends of the bus bars are provided with wiring connectors and an insulating headblock which are also designed to cooperatively interlock with the bus bars to support the latter.

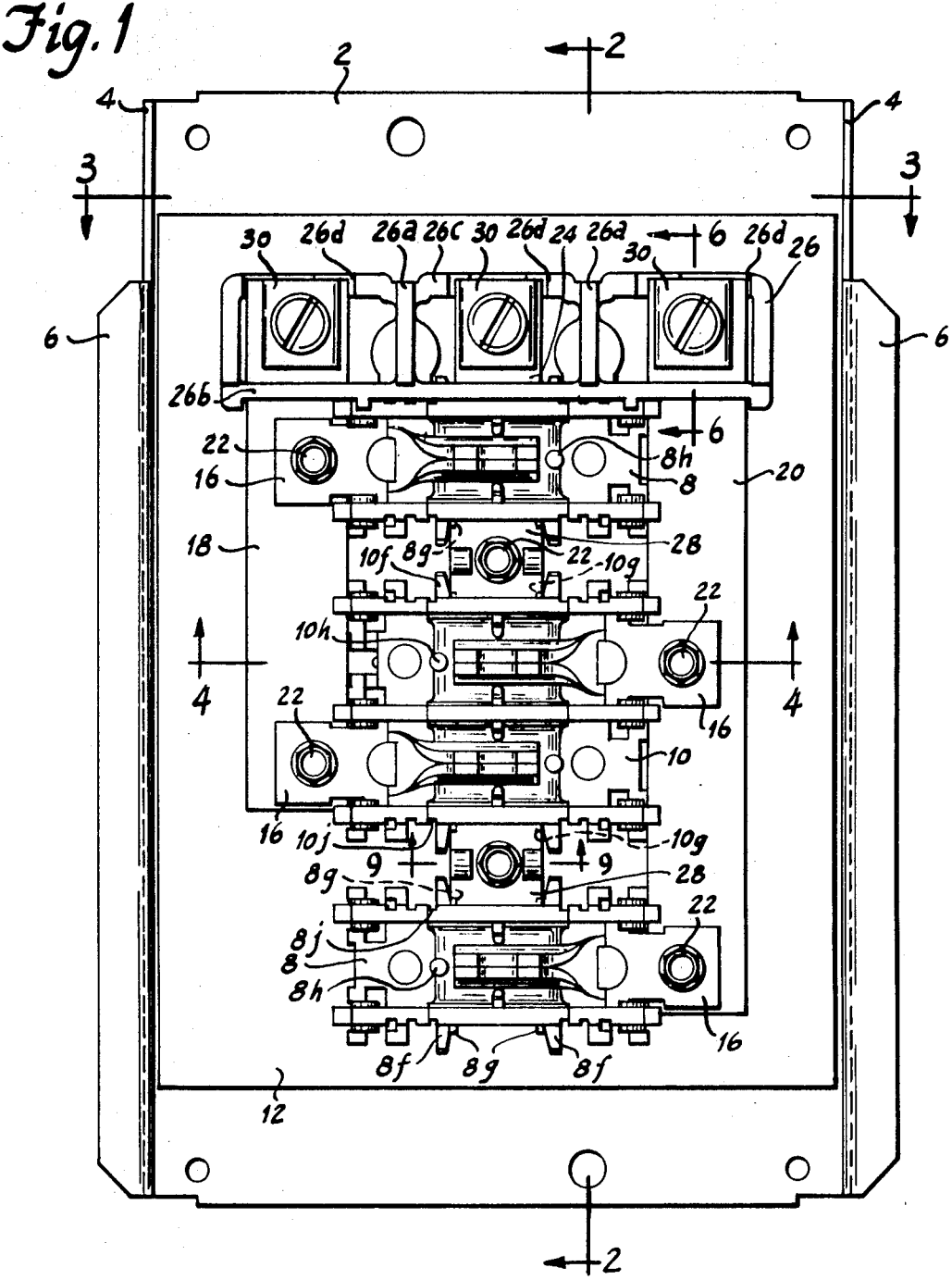

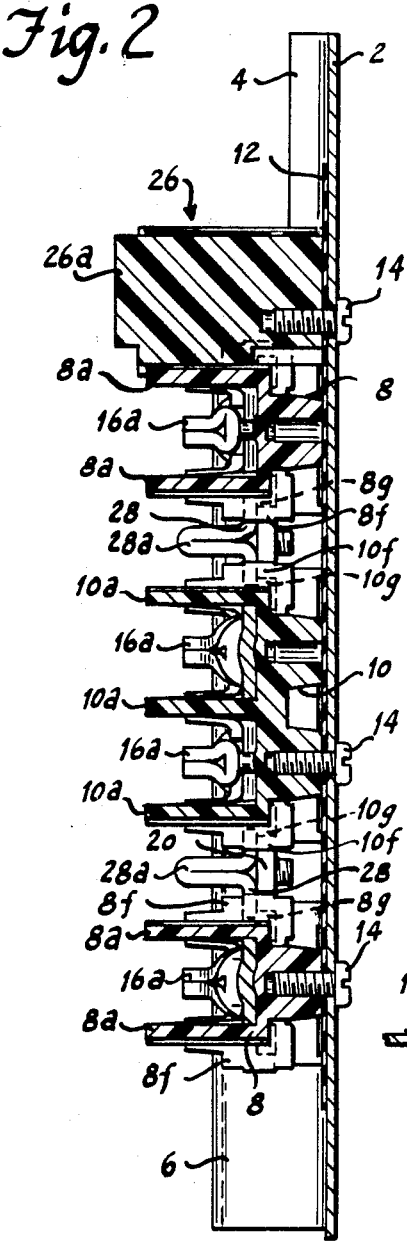
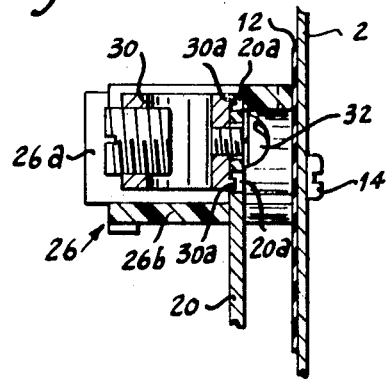
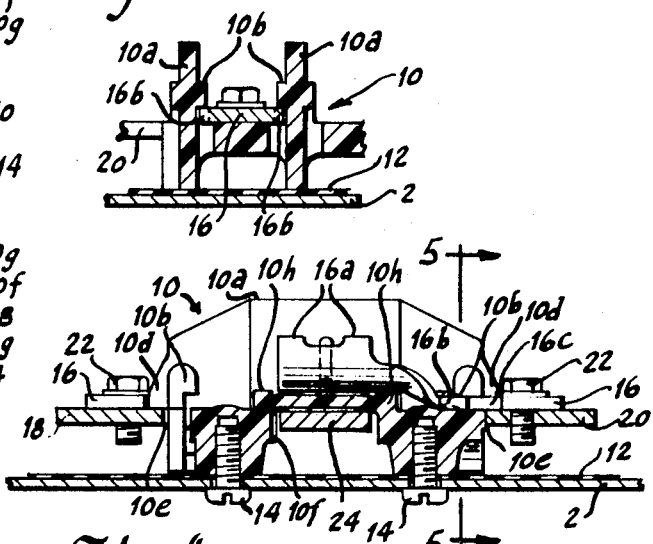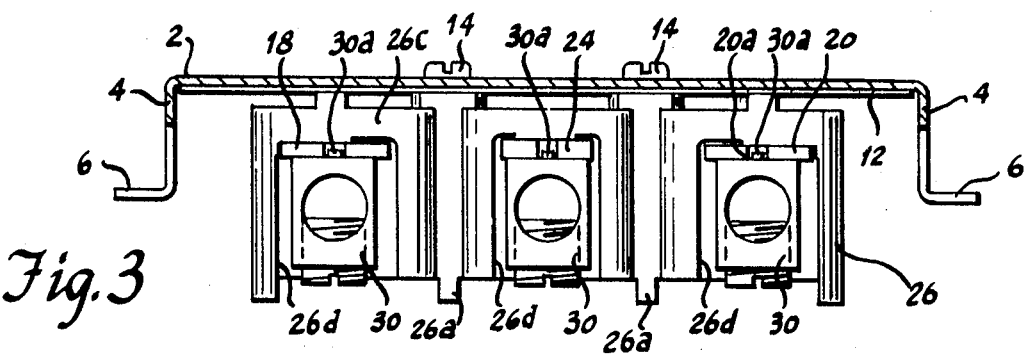

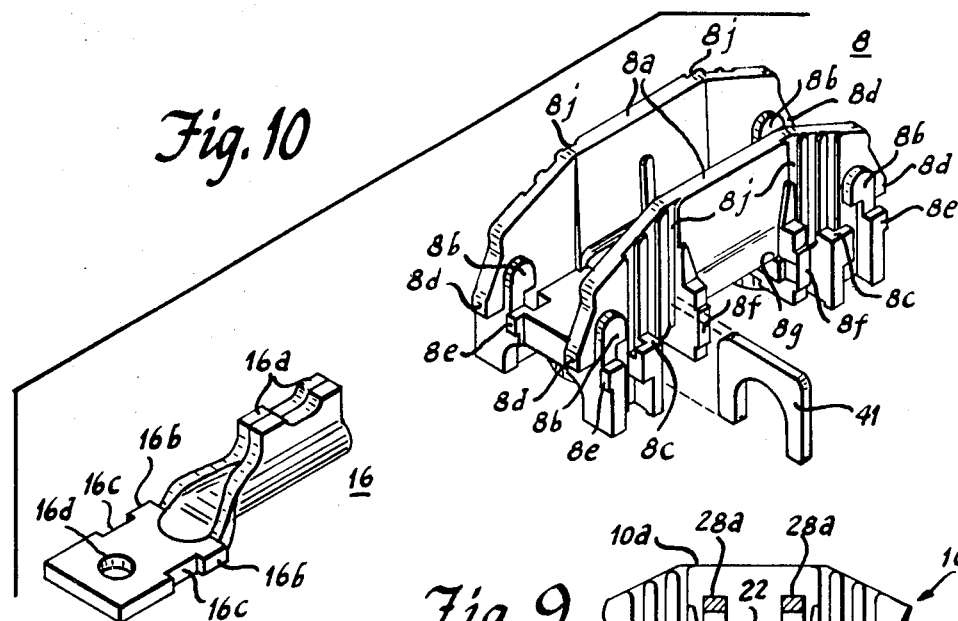
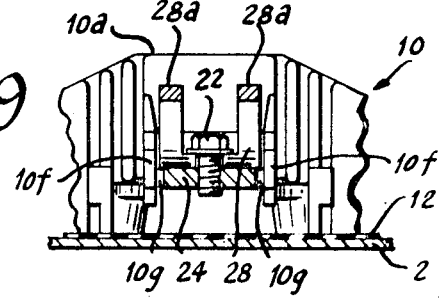
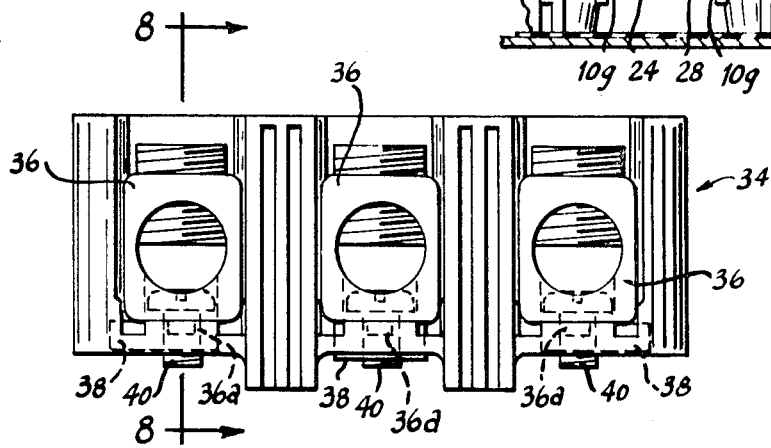
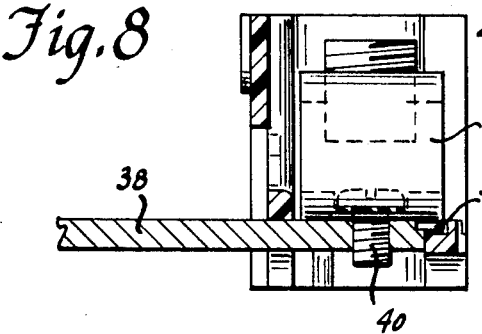
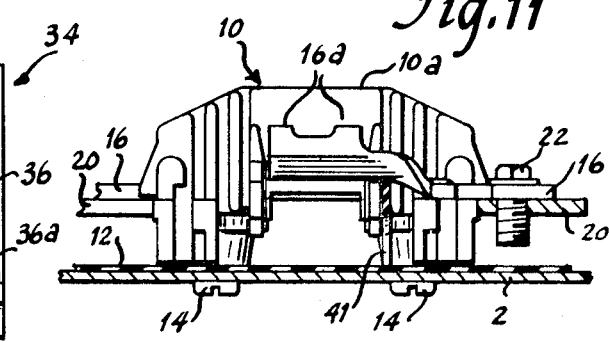

3,611,048

PANELBOARD FOR CIRCUIT BREAKER LOAD CENTERS WITH INSULATOR BLOCK SUPPORTING CONNECTOR AND CONNECTOR SUPPORTING BUS BAR

BACKGROUND OF THE INVENTION

This invention relates to load center distribution apparatus and more particularly to a multicircuit panelboard therefor. Specifically the invention is concerned with improvements in the several components that comprise the panelboard to increase the operating quality of the panelboard and to reduce the number of separate parts, the size of the panelboard and the cost thereof.

Circuit breaker load centers are required to meet a large variety of applications. Since the structural size of the circuit breakers and their arrangement and spacing within the various load centers remains uniform, the design flexibility must necessarily be provided in the internal panelboard upon which the circuit breakers are mounted. The panelboard provides terminals for connecting the electrical supply to the panelboard mounted bus bars which have branch connectors thereon for electrically connecting the circuit breakers and their respective circuits to the supply. The panelboard may be required to provide for single phase, three phase three or four wire, or split bus arrangements in various ampere ratings and with various specified numbers of circuits.

A major problem in the design of the panelboards is to establish a commonality of parts to prevent accumulation of a huge inventory of parts each distinct from each other and specific to only a few applications. While this design problem is as large as the variety of panelboards, it is also compounded by the size, spacing and insulating requirements necessary for the various ratings.

SUMMARY OF THE INVENTION

This invention provides a pair of insulating base components and cooperating branch connector members which can be arranged to provide an improved panelboard of any particular rating and type desired, the resulting panelboard featuring good heat-dissipating qualities, low cost and ease of assembly.

BRIEF DESCRIPTION OF THE DRAWINGS

FIG. 1 is a front view of the panelboard assembly of this invention;

FIG. 2 is a longitudinal cross-sectional view of the panelboard assembly taken generally along the line 2—2 in FIG. 1;

FIG. 3 is a transverse cross-sectional view of the panelboard assembly taken generally along the line 3—3 in FIG. 1;

FIG. 4 is also a transverse cross-sectional view of the panelboard assembly taken through an insulating base member along the line 4—4 in FIG. 1;

FIG. 5 is a cross-sectional view taken along the line 5—5 in FIG. 4 to illustrate a cooperating relationship between the components shown therein;

FIG. 6 is a cross-sectional view taken through a line terminal end of one of the bus bars and the insulating headblock of the panelboard assembly of FIG. 1 as indicated by the line 6—6 of FIG. 1;

FIG. 7 is an elevational view of an alternate insulating headblock and wire terminal assembly utilized in larger ampere rated devices;

FIG. 8 is a cross-sectional view of the alternate headblock assembly taken along the line 8—8 of FIG. 7;

FIG. 9 is a cross-sectional view taken generally along the line 9—9 in FIG. 1 to show the connection for the center bus bar;

FIG. 10 is an isometric view of one of the insulating base members and a branch connector member in spaced-apart relationship together with an insulator required for an alternate construction; and FIG. 11 is a cross-sectional view showing an alternate construction of the panelboard assembly.

DESCRIPTION OF THE PREFERRED EMBODIMENTS

With reference to the drawings and particularly FIG. 1, a 125 a. three-phase panelboard assembly is shown to exemplify the invention. The panelboard assembly is built upon a sheet metal panel 2 which may in turn be mounted within the load center enclosure in any conventional manner known in the art. Panel 2 is formed with a pair of opposite upstanding sides 4 which have outwardly formed rail portions 6 at their outer ends for attaching one end of the circuit breaker units thereon in a well-known manner. The length of the panel may vary according to the number of circuits required as will become apparent in later description.

Three molded insulating bases are used in the panelboard of FIG. 1. Single-space bases 8 are used at the top and bottom of the panelboard and a double space base 10 is used intermediate the two bases 8. The single-space base 8 is shown in isometric form in FIG. 10. The double-space base 10 is substantially two of the single-space bases 8 formed adjacently to share a common central wall portion. Reference will be had to the isometric view of base 8 to describe many of the details of either base 8 or 10.

An insulating sheet 12 is placed on the bottom of panel 2 and the bases 8, 10 and 8 are arranged in a longitudinal row upon the sheet 12 along the centerline of panel 2. The bases 8 and 10 may be likened to bridge members having a floor portion extending between upstanding walls 8a and 10a, respectively, and having depending formations at the ends which rest upon the insulator sheet 12. The bridgelike shape of the bases 8 and 10 and their arrangement along the centerline of the panel 2 creates a central, longitudinally extending tunnel which may be seen to house a center bus bar 24 in a manner to be described later.

With reference again to FIG. 1, it can be seen that the insulating bases 8 and 10 are longitudinally spaced along the panel to establish an additional circuit breaker mounting space between adjacent cooperating wall portions 8a and 10a. The particular panelboard shown thus has six spaces for mounting two circuit breakers each to establish 12 branch circuits. Additional circuits are formed by adding more bases to the lower end of the row, a longer panel 2 being provided as necessary. The bases are each provided with a pair of holes molded into the underside of the depending end formations as best seen in FIG. 4. The panel 2 and insulator 12 are also provided with pairs of holes which align with the holes in the bases and are formed on specific centers to achieve the required spacing for the bases. As seen in FIGS. 2 and 4, thread-cutting screws 14 pass through the holes in panel 2 and insulator 12 from the rear of the panel to take into the holes in the base 10 and lower base 8 to tightly fasten those particular bases to the panel. The positioning of the upper base 8 relies upon other factors which will be brought out in later description.

The bases 8 and 10 are provided with a plurality of interrelated formations at the opposite ends of each space which may best be described with particular reference to the base 8 shown in FIG. 10. The upstanding walls 8a have outwardly extending ears 8b formed on opposite sides to provide overhanging ledges spaced off the floor portion of the base. The external sides of wall portions 8a are also provided with outwardly projecting shelves 8c which are coplanar with the floor portion between the walls to serve as a floor surface with respect to the overhanging ledge of the external ears 8b. The walls 8a are also provided with extensions 8d which project beyond the opposite ends of the base to present overhanging ledges coplanar with the floor of the base. The vertical walls at the ends of the base have a plurality of pads 8e formed thereon just below the plane of the floor. Although only two such pads are visible in FIG. 10, four pads 8e are provided at each end of the single space base 8, the pads being formed in cooperating pairs disposed equally on opposite sides of the extensions 8d. The double space base 10 is provided with identical formations at the opposite ends of each space, corresponding formations being given corresponding reference numerals and suffixes 10b through 10e in the drawings.

Also shown in FIG. 10 is a branch electrical connector member 16 which cooperates with the above-described formations in the molded base members 8 or 10. One end of the connector 16 is formed over to provide plug-in connector portions 16a for receiving the circuit breaker connector thereon. The other end of the connector 16 remains flat and is provided with outwardly projecting tabs 16b which are established by a pair of lateral notches 16c formed to clear the outwardly formed projections 8b of base 8 or 10b of base 10. A hole 16d is also provided in the flat end of connector 16.

The connectors 16 are used to attach the outside pair of bus bars 18 and 20 to the insulating bases 8 and 10. With particular reference to FIG. 1 a pair of connectors 16 are placed in the left-hand ends of the upper base 8 and the lower space of base 10 to have the folded over portion 16a extend toward the center of the bases and have the flat end portion thereof extend outwardly beyond the left-hand ends of the bases. The connectors 16 rest upon the floor portions of the respective bases and are slid outwardly to the left whereby the tabs 16b underlie the overhanging ledges of ears 8b and 10b of bases 8 and 10, respectively (FIGS. 4 and 5). The edges of tabs 16b adjacent the notches 16c abut against the vertical portions of outwardly projecting ear formations 8b and 10b to provide a limit stop for movement of connectors 16 outwardly to the left. To prevent downward movement of the formed-over portion 16a (FIG. 10), due to flexure of the connector 16 about its flat portion adjacent the projecting tabs 16b when a circuit breaker is connected thereon, an upstanding projection 8h and 10h (FIG. 1) on the floor portion of the bases 8 and 10 is provided to engage the underside of the formed portion 16a. While not specifically shown, it is to be understood that bus bar 18 is provided with a pair of stamped holes in respective alignment with the holes 16d of the above-mentioned pair of connectors 16 and that the bus bar is secured to the overhanging flat end portions of these connectors by a pair of thread-cutting screws 22 which pass through holes 16d in the connector to take into the holes in the bus bar and draw bus bar 18 upward against the connectors. As seen best at the left-hand side of FIG. 4, the bus bar 18 is also drawn upward against the underside of extensions 8d and 10d of bases 8 and 10, respectively and that the bus bar is held firmly against the pads 8e and 10e of bases 8 and 10 respectively. Thus the bus bar 18 is firmly secured to the sides of the insulating base members 8 and 10; is prevented from upward movement by overhanging ledges of the extensions 8d and 10d of the respective bases; is prevented from movement to the left in FIG. 1 away from the bases 8 and 10 by the engagement of the tabs 16b with the vertical portions of ear projections 8b or 10b; and is prevented from upward and downward movement by means of the engagement of tabs 16b with the overhanging ledges of the ear projections 8b or 10b.

In a similar manner the right-hand bus bar 20 is secured to the bases 8 and 10. Two connectors 16 are positioned in the right-hand ends of the lower base 8 and the uppermost space of base 10. Bus bar 20 is formed longer than bar 18, the bar 20 extending from the headblock 26 at the top of the panel down to the lowermost base 8 and is provided with holes in alignment with the holes 16d of the last-mentioned pair of connectors 16 to receive a pair of thread-cutting screws 22. Through the same cooperation of elements as previously described, the bus bar 20 is held firmly to the sides of bases 8 and 10. The bus bar 20 also is positioned firmly against the right-hand side of uppermost base 8 since that base is maintained in position by its connection with the bus bar 18 and the latter's connection with the base 10.

A center bus bar 24 is also provided in the panelboard assembly of FIG. 1, although it is visible only in the center pocket of the headblock 26 at the top of the panelboard. Center bus bar 24 extends from the headblock 26 down to the space between the base 10 and the lowermost base 8. With reference particularly to FIGS. 9 and 10, the bases 8 and 10 are provided with insulating barrier portions 8f and 10f, respectively, which project outwardly of the external surfaces of walls 8a and 10a respectively and which extend along the undersides of the respective base members to create an insulating trough for the center bus bar. At the juncture of the barriers 8f and 10f with the sidewalls of the respective bases 8 and 10, there is formed a small rectangular boss 8g and 10g, respectively, only one of which appears in the isometric view of FIG. 10. The bosses 8g and 10g present an upper surface which is coplanar with the floor of the respective base and with the shelves 8c or 10c. As seen in FIG. 1, adjacent bases 8 and 10 form a rectangular pocket over the center bus bar 24 which is defined by the external side surfaces of the bases 8 and 10 and the outwardly projecting pairs of barriers 8f and 10f. The ledges presented by the upper surfaces of bosses 8g are provided at each of the four corners of the above-defined rectangular pocket.

A rectangular electrical connector member 28 is provided for the center bus bar. The connector 28 is formed with a central clearance hole for thread-cutting screw 22 and with a pair of upstanding stab-on connector portions 28a for electrical connection with the circuit breaker connectors. The external rectangular shape of connector 28 is dimensionally toleranced to be closely confined within the rectangular pocket formed by adjacent bases 8 and 10, and rests at its four corners upon the upper ledges of bosses 8g and 10g. Two connectors 28 are provided on the panelboard assembly in the drawings, one at the space between the upper base 8 and base 10 and one at the space between the base 10 and the lower base 8. Screws 22 pass through the clearance openings provided in connectors 28 and take into holes stamped in the center bus bar 24 to draw that bar tightly against the connectors and the undersides of the bases 8 and 10.

In some applications, a center bus bar is not required and only the two outer bus bars are used. The base members 8 and 10 are still spaced apart, but the branch connectors 16 are inserted in the space where necessary. These connectors 16 extend alternately to either side, and when one is used in a space between insulating bases it rests upon the cooperating shelf portions 8c or 10c. The tabs 16b extend under the cooperating external ears 8b and 10b in the same manner as described earlier. To prevent downward flexure of the formed-over portion 16a of connector 16 an insulator 41 is positioned between adjacent base members to serve in a supporting manner similar to the projections 8h and 10h. With reference to FIGS. 1 and 10, vertical grooves 8j and 10j are provided on the external side surfaces of the respective base members 8 and 10 to cooperatively receive the opposite ends of insulator 41 therein. The insulator 41 rests upon the sheet 12 and the connector 16 bears upon the upper edge as seen best in the sectional view of FIG. 11. Although not specifically shown in the drawings, an alternate method of providing support for the formed over portion 16a of connector 16 when secured in the space between adjacent bases would be to extend the barrier portions 8f or 10f further to a distance of one-half the space and form the upper surface of the barriers at a specific height which would be coplanar with the projections 8h or 10h, thereby establishing cooperating bridge portions for the connector portion 16a.

The upper ends of the bus bars 18, 20 and 24 project beyond the upper base 8 and terminals in a straight line transversely of the panel. A line terminal pressure wire connector 30 is provided on the end of each of the bus bars 18, 20 and 24 for connection to the electrical supply source. A cross-sectional view of the line terminal end of bus bar 20 is shown in FIG. 6, the structure for each of the other bus bars 18 and 24 being identical. As seen in FIG. 6 terminal member 30 is secured to the bar 20 by a screw 32 which takes into the terminal from the rear side of the bus bar. Rotation of the terminal 30 upon the bus bar is prevented by the interlocking engagement of depending tabs 30a on terminal 30 extending into cooperating openings 20a in bus bar 20.

Insulating headblock 26 is a molded rectangular frame structure having a pair of interior walls 26a which divide the member into three separate pockets, one for the terminal end of each bus bar. With respect to the position of headblock 26 relative to the panelboard assembly shown in FIG. 1, the lowermost wall 26b of headblock 26 is solid along the outermost edge and contains cutouts along the innermost edge to straddle the bus bars as well as the projections 8f of upper base 8. The uppermost wall 26c of headblock 26 is solid along the inner edge with respect to the panel 2 and has cutouts 26d open to the outer edge to expose the wire connectors 30 (FIG. 3). The headblock 26 is assembled to the panelboard by placing it over the terminal ends of the bus bars at a position which is offset upwardly an amount sufficient to permit the upper wall 26c thereof to clear the ends of the bus bars and wire connectors. When the headblock 26 is resting against the insulator sheet 12 it may be slid downwardly with respect to the panel assembly whereby the portions of wall 26c adjacent cutouts 26d are slid under the ends of bus bars 18, 20 and 24 to support the same. A pair of thread cutting screws 14 are again employed from the rear of panel 2 to pass through openings in the panel and insulator sheet 12 to take into openings formed in the rear of headblock 26 to secure the latter in position upon the panel. The lowermost wall 26b can be seen to overlie the bus bars in FIG. 6 and thereby prevents the bus bar and upper base 8 assembly from raising off the panel 2.

A modified wire terminal end assembly for a higher amperage panelboard is shown in FIGS. 7 and 8. The assembly includes a modified molded insulating headblock 34 which is partitioned off into three chambers for receiving the wire connectors 36 and the ends of three bus bars 38. As seen in the cross-sectional view of FIG. 8, the connectors 36 are secured to the ends of the bus bars 38 from the front thereof by a screw 40 which passes through an opening in the connector 36 to take into an opening in the bus bar 38. A depending tab 36a is again formed on the bottom of the connector 36 to engage with a mating depression in the end of the bus bar. In this version, however, the connector 36 extends beyond the end of the bus bar and is positioned over the upper wall of the headblock 34 to support the end of the bus bar. The lower wall of the headblock rests upon, or straddles the bus bars similar to the wall 26b of headblock 26.

It should be seen from the foregoing description that a panelboard is provided herein which can be built from but a few separate and distinct pieces to greatly reduce the inventory required to produce a line of panelboards. One feature contributing to the reduced inventory is the use of a single kind of thread-cutting screw to secure the branch connector fingers 16 or 28 to the bus bars and utilizing the mechanical portion of that electrical connection to mount the bus bars to the base members. It should be noted that any thickness of bus bar can be accommodated by the present design, as well as varying widths in the case of the outer two bus bars 18 and 20. The cantilevered mounting of these latter bus bars permits improved cooling thereof by exposing a maximum of bus bar surface to the ambient atmosphere. It is to be understood that the panelboard disclosed herein is susceptible to various modifications without departing from the scope of the appended claims.

I claim:

1. In an electrical panelboard assembly including a panel and insulating base means secured thereto, means for attaching a bus bar adjacent one edge of the base in a cantilevered fashion comprising, in combination:
   insulating base means;
   electrical connector means on said insulating base means and extending beyond one edge of said base means;
   means on said insulating base means engaging with said electrical connector means to limit movement thereof toward said edge;
   means on said insulating base means overlying a portion of said electrical connector means between the ends thereof;
   a bus bar adjacent said edge of said insulating base means; and
   means joining said bus bar and the portion of said electrical connector means extending beyond said edge to retain said bus bar against said edge and to prevent movement of said electrical connector means away from engagement with said overlying means of said insulating base means.

2. The combination according to claim 1, together with:
   electrical connector means on said insulating base means extending beyond an opposite edge thereof;
   means on said insulating base means engaging with said last-mentioned electrical connector means to limit movement thereof toward said opposite edge;
   means on said insulating base means overlying a portion of said last-mentioned electrical connector means between the ends thereof;
   a bus bar adjacent said opposite edge of said insulating base means; and
   means joining said last-mentioned bus bar and the portion of said last-mentioned electrical connector means extending beyond said opposite edge to retain said last-mentioned bus bar against said opposite edge and to prevent movement of said last-mentioned electrical connector means away from engagement with said last-mentioned overlying means of said insulating base means.

3. The combination according to claim 2 wherein the ends of said electrical connector means positioned on said insulating base means overlap each other to form a row intermediate said bus bars and parallel thereto, said electrical connector means being longitudinally spaced apart along said row.

4. In an electrical panelboard assembly including a panel and at least one insulating base member secured thereto, means for attaching a bus bar to said insulating base member comprising, in combination:
   an insulating base member having spaced-apart upstanding portions formed thereon;
   electrical connector means positioned on said insulating base member between said upstanding portions and having a portion thereof extending beyond an edge of said insulating base member;
   a slot formed in each of said upstanding portions, said slots being closed toward said edge of said insulating base member and open toward an opposite edge thereof;
   lateral projections on said electrical connector means, said projections engaging with said slots to abut against the closed ends thereof;
   a bus bar adjacent said edge of said insulating base member; and
   means joining said bus bar and the portion of said electrical connector means extending beyond said edge of said insulating base member to retain said bus bar against said edge and to prevent movement of said electrical connector means lateral projections out of engagement with said slots.

5. The combination according to claim 4 together with:
   a second slot formed in each of said upstanding portions of said base members, said second slots being closed toward said opposite edge of said insulating base member and open toward the first-mentioned edge thereof; and
   wherein said electrical connector means is reversed upon said insulating base member to extend beyond said opposite edge to be jointed to and retain a bus bar thereagainst.

6. The combination according to claim 4 wherein:
   a plurality of said insulating base members are secured to said panel in a longitudinally extending row, adjacent ones thereof being spaced apart and having projections formed on their adjacent sides;
   another of said electrical connector means being positioned between respective adjacent upstanding portions of adjacent ones of said insulating base members upon said projections and extending beyond the aligned edges of adjacent insulating base members;

a slot formed in each of said upstanding portions, said slots of adjacent upstanding portions being closed toward said edge of said insulting base members and open toward an opposite edge thereof;

said lateral projections on said electrical connector means engaging with the closed ends of the respective slots; and means joining said portion of the last-mentioned electrical connector means and said bus bar to retain said bus bar against said edges of the respective adjacent insulating base members 7. The combination according to claim 6 together with insulating means inserted between said adjacent base members and cooperating with the adjacent sides thereof to be positioned against lateral movement relative thereto, said last-mentioned insulator providing additional support for said electrical connector means.

8. The combination according to claim 4 wherein:

a plurality of said insulating base members are secured to said panel in a longitudinally extending row, adjacent ones thereof being spaced apart and having projections formed on the adjacent side surfaces thereof substantially intermediate the opposite edges thereof; together with:

a bus bar extending along said row of insulating base members substantially intermediate the opposite edges and at the underside thereof;

electrical connector means positioned between adjacent ones of said insulating base members upon said projections to overlie said last-mentioned bus bar, said last-mentioned electrical connector means having portions engaging the respective upstanding portions of said adjacent insulating base members to be positioned against longitudinal movement and having portions thereof in engagement with said projections to be positioned against lateral movement; and means joining said last-mentioned electrical connector means and said last-mentioned bus bar to retain the latter against the undersides of said insulating base members.

9. An electrical panelboard assembly comprising; in combination:

a panel;

a plurality of insulating base members secured to said panel in a longitudinally extending row;

electrical connector means positioned in certain ones of said insulating base members to extend outwardly beyond one end of the respective base member transversely of the row of insulating base members, said connector means each having opposed lateral tabs formed thereon;

stop means formed on each of said insulating base members, said stop means engaging said opposed lateral tabs to limit movement of said connector means outwardly of the respective base member;

ledge portions formed on each of said insulating base members, said ledge portions overlying at least a portion of said opposed lateral tabs of said connector means when the latter are engaged with said stop means;

a bus bar extending longitudinally along said row of insulating base members, said bus bar being adjacent the ends of said insulating base members which define a lateral edge of said row of insulating base members and said bus bar also being adjacent said outwardly extending portions of said electrical connector means; and means joining said bus bar and said outwardly extending portions of said electrical connector means to hold said bus bar against said lateral edge of said row of insulating base members.

10. The combination according to claim 9, wherein:

adjacent ones of said insulting base members are longitudinally spaced apart upon said panel;

the external side surfaces of said insulating base members have one-half of said stop means and said ledge portions formed thereon along with outwardly extending shelf portions spaced from said ledge portions;

adjacent side surfaces of said spaced-apart insulating base members cooperate to receive another of said electrical connector means therebetween, said connector means resting upon said shelf portions to extend outwardly beyond a lateral edge of said row of insulating base members, said stop means of said adjacent side surfaces engaging said opposed lateral tabs of said connector means to limit outward movement of said connector means and said ledge portions overlying at least a portion of said opposed lateral tabs of said connector means when the latter are engaged with said last-mentioned stop means;

together with means joining said outwardly extending portions of said electrical connector means and said bus bar to hold said bus bar against said lateral edge of said row of insulating base members.

11. The combination according to claim 10 together with insulating means inserted between said adjacent base members and cooperating with the adjacent sides thereof to be positioned against lateral movement relative thereto, said last-mentioned insulator providing additional support for said electrical connector means.

12. The combination according to claim 9 wherein adjacent ones of said insulating base members are longitudinally spaced apart upon said panel member; together with:

projections formed on the external side surfaces on each of said insulating base members substantially intermediate the opposite ends thereof, said projections including a pair of coplanar ledge portions;

a bus bar extending longitudinally along said row of insulating base members substantially intermediate the opposite ends of said insulating base members and at the underside thereof;

electrical connector means positioned between said adjacent insulating base members upon said last-mentioned coplanar ledge portions to overlie said last-mentioned bus bar, said last-mentioned connector means having portions thereof engaging the respective adjacent external side surfaces to be positioned against longitudinal movement therebetween and further having portions thereon engaging said projections to be positioned against lateral movement therebetween; and means joining said last-mentioned connector means and last-mentioned bus bar to hold the against the underside of said row of insulating base members.

13. The combination according to claim 12 together with:

a third bus bar extending longitudinally along an opposite lateral edge of said row of insulating base members;

electrical connector means positioned in certain ones of said insulating base members to extend outwardly beyond an end of the respective base member defining said opposite lateral edge of said row of insulating base members, said connector means each having opposed lateral tabs formed thereon;

stop means formed on each of said insulating base members, said stop means engaging with said opposed lateral tabs to limit movement of said connector means outwardly of the respective base member;

ledge portions formed on each of said insulating base members, said ledge portions overlying at least a portion of said opposed lateral tabs of said connector means when the latter are engaged with said stop means; and means joining said third bus bar and said portions of said electrical connector means extending beyond said opposite lateral edge to hold said third bus bar against said opposite lateral edge of said row of insulating base members.

14. The combination according to claim 13 wherein said insulating base members are provided with extensions at the opposite ends thereof to overlie portions of the respective bus bars, the underside of said projections being substantially coplanar with the upper surfaces of said bus bars to provide additional support for said bus bars when the latter are joined with said first-mentioned electrical connector means.

15. The combination according to claim 3 wherein said bus bars project longitudinally beyond the endmost insulating base member of said longitudinally extending row, together with:

pressure-type wiring connector means secured to said bus bars at the projecting ends thereof to provide supply line termination assemblies for said panelboard; and an insulating headblock member disposed over said termination assemblies and secured to said mounting pan, said headblock having a first wall portion adjacent said endmost insulating base member formed to rest upon said bus bars and having a second wall portion opposite the first wall portion underlying said termination assemblies to support the latter.

PO-1050
(5/69)

UNITED STATES PATENT OFFICE
CERTIFICATE OF CORRECTION

Patent No. 3,611,048            Dated February 9, 1972

Inventor(s) Bertrum S. Shelvik

It is certified that error appears in the above-identified patent and that said Letters Patent are hereby corrected as shown below:

Column 6, line 64, reads: "jointed" and should read --joined--

Column 8, line 41, reads: "the against" and should read:
                                   --the latter against--

Signed and sealed this 9th day of May 1972.

(SEAL)
Attest:

EDWARD M. FLETCHER, JR.          ROBERT GOTTSCHALK
Attesting Officer                   Commissioner of Patents